US007769759B1

(12) United States Patent
Gartung et al.

(10) Patent No.: US 7,769,759 B1
(45) Date of Patent: Aug. 3, 2010

(54) DATA CLASSIFICATION BASED ON POINT-OF-VIEW DEPENDENCY (75) Inventors: Daniel Gartung, Hillsborough, CA (US); Philip Chan, South San Francisco, CA (US); John Rotherham, Sunnyvale, CA (US)

(73) Assignee: Biz360, Inc., San Mateo, CA (US)

( * ) Notice: Subject to any disclaimer, the term of this patent is extended or adjusted under 35 U.S.C. 154(b) by 745 days.

(21) Appl. No.: 10/931,291

(22) Filed: Aug. 30, 2004

Related U.S. Application Data (60) Provisional application No. 60/499,196, filed on Aug. 28, 2003.

(51) Int. Cl.
*G06F 17/30* (2006.01)
(52) U.S. Cl. ...................................... 707/737
(58) Field of Classification Search .................. 707/101
See application file for complete search history.

(56) References Cited

U.S. PATENT DOCUMENTS

| | | | | |
|---|---|---|---|---|
| 5,737,591 | A * | 4/1998 | Kaplan et al. ................... 707/1 |
| 5,832,470 | A * | 11/1998 | Morita et al. ................... 707/1 |
| 6,243,723 | B1 * | 6/2001 | Ikeda et al. ................. 715/210 |
| 6,421,463 | B1 * | 7/2002 | Poggio et al. ............... 382/224 |
| 6,446,061 | B1 * | 9/2002 | Doerre et al. ................... 707/3 |
| 6,505,195 | B1 * | 1/2003 | Ikeda et al. ..................... 707/3 |
| 2001/0044759 | A1 * | 11/2001 | Kutsumi et al. ........... 707/104.1 |
| 2002/0059303 | A1 * | 5/2002 | Ohmori et al. ........... 707/104.1 |
| 2002/0124187 | A1 * | 9/2002 | Lyle et al. ................... 713/201 |
| 2002/0199194 | A1 * | 12/2002 | Ali ............................... 725/46 |
| 2003/0037151 | A1 * | 2/2003 | Montvay et al. ............ 709/229 |
| 2003/0101163 | A1 * | 5/2003 | Lui et al. ........................ 707/1 |
| 2003/0115193 | A1 * | 6/2003 | Okamoto et al. ............... 707/3 |
| 2003/0225763 | A1 * | 12/2003 | Guilak et al. .................. 707/7 |
| 2004/0025178 | A1 * | 2/2004 | Gordon et al. ................ 725/37 |
| 2004/0049534 | A1 * | 3/2004 | Nickerson et al. ........... 709/203 |
| 2004/0083270 | A1 * | 4/2004 | Heckerman et al. ......... 709/207 |

(Continued)

OTHER PUBLICATIONS

Keen, "Term position ranking: some new test results", Jun. 1992, Proceedings of the 15th Annual SIGIR, p. 66-76.*

(Continued)

*Primary Examiner*—Khanh B Pham
(74) *Attorney, Agent, or Firm*—Townsend and Townsend and Crew LLP (57) ABSTRACT

Data classification is used to classified input items by associating the input items with one or more classes from a set of one or more classes in a data classification system, including identifying relevant features in an input item to form a feature vector for the input item, receiving at the data classification system an indication of a point-of-view, adjusting the feature vector according to the point-of-view indication or modifying a pattern discriminator (e.g., trainer and classifier) to inline-process feature vectors depending on the provided point-of-view (e.g., SVM custom kernels), and classifying the input item into the set of classes according to the point-of-view. The point-of-view data can be introduced either as a pre-process step prior to passing it off to the pattern discrimination algorithm, or can be incorporated directly into the pattern discrimination algorithm if applicable. The pattern discrimination algorithms can detect arbitrary patterns given a similarly prepared dataset during both training and subsequent classification of unclassified documents.

13 Claims, 6 Drawing Sheets

U.S. PATENT DOCUMENTS

2005/0004857 A1* 1/2005 Schwarz et al. ............... 705/36
2005/0108001 A1* 5/2005 Aarskog ...................... 704/10
2005/0262039 A1* 11/2005 Kreulen et al. ................ 707/1

OTHER PUBLICATIONS

McDonald et al., "Using Sentence-Selection Heuristics to Rank Text Segments in TXTRACTOR", Jul. 13-17, 2002, ACM, p. 28-35.*

Biz360.com, "Point-of-View Sentiment", Jan. 23, 2007, <http://www.biz360.com/solutions/pov.html>.*

Cortese, "BusinessWeek Online SmallBiz",Retrieved Jan. 23, 2007, Article reprint of Jun. 2004, Biz360.com <http://www.biz360.com/articles/businessweek630004.html>.*

Cristianini et al., An Introduction to Support Vector Machines, Dec. 2000, p. 30-31, cover pages.*

Yourdirectionary.com, definition of "sentiment", Jan. 2009, LoveToKnow Corp., p. 1-3, <Retrieved from the internet Feb. 7, 2009>.*

USPTO, TEAS Database Query on owner "360biz" or mark "sentiment", Feb. 9, 2009, p. 1-3, <Retrieved via internet Feb. 9, 2009>.*

Hirao et al, "Extracting Inmportant Sentences with Support Vector Machines", Dec. 2002, p. 1-7, <Retrieved from Examiner files Feb. 9, 2009>.*

\* cited by examiner

Step 1 of 4: Choose a point of view
Choose your point of view for this training session.

- ◉ Microsoft (May 15, 2003)
- ○ Sun Microsystems (May 14, 2003)
- ○ Hewlett-Packard (May 13, 2003)
- ○ Dell (April 7, 2003)
- ○ Gateway (December 1, 2003)
- ○ Apple
- ○ Sony Electronics Continue Training guidelines

FIG. 5

Step 2 of 4: Review positive predictions for Microsoft
Please confirm, correct or ignore the positive rating for these articles.

| Article title & publisher | Positive | Neutral | Negative | Ignore |
|---|---|---|---|---|
| Investing In Government Spending -- Yahoo! News | ● | ○ | ○ | ○ |
| Dr. Jac Fitz-enz Founds New Strategic Analysis and Forecasting Company --Asia Computer Weekly | ● | ○ | ○ | ○ |
| 5/28/03 - 52W HIGH: New 52 - Wk High for MSTR @ $36.220 up 2.32% [delayed] -- Business Wire | ● | ○ | ○ | ○ |
| XML for Analysis Council Gains Momentum and Added Industry Support -- Wall Street City | ● | ○ | ○ | ○ |
| The Art of the Deal -- How AXA Financial negotiated with IBM for a usage-based outsourcing pact -- New York Times | ● | ○ | ○ | ○ |
| 5/23/03 - SAS Grant Helps Ohio Department Attract, Serve and Profit From Recreational Visitors $100, 111, three-year grant provides significant technology enhancements -- The Daily Ohio | ● | ○ | ○ | ○ |
| IPOs perk up, but serious recovery elusive Commentary: Activity up: Formfactor to debut soon -- Business 2.0 | ● | ○ | ○ | ○ |
| 5/28/03 - Dr. Jac Fitz-enz Founds New Strategic Analysis and Forecasting Company 'Father of Human Capital Benchmarking' Steps Up to New challenge: Increasing Shareholder Value through Workforce Analysis and Forecasting -- Statistics Weekly | ● | ○ | ○ | ○ |
| Ovum-TNS Survey Shows Worrying Disconnect Between Business Intelligence Vendors and Users -- CRM Monthly | ● | ○ | ○ | ○ |
| Banks Have To Get IT Right -- A really, really long publication mane | ● | ○ | ○ | ○ |

(Continue)

Training guidelines

FIG. 6

DATA CLASSIFICATION BASED ON POINT-OF-VIEW DEPENDENCY

CROSS-REFERENCE TO RELATED APPLICATIONS

This application claims priority from U.S. Provisional Patent Application No. 60/499,196 filed Aug. 28, 2003 entitled DATA CLASSIFICATION BASED ON POINT-OF-VIEW DEPENDENCY which is hereby incorporated by reference, as if set forth in full in this document, for all purposes.

FIELD OF THE INVENTION

The present invention relates to automated data classification in general and data classifiers of documents based on content in particular.

BACKGROUND OF THE INVENTION

Data classification systems are useful in many applications. One application is in filtering data, as might be done as part of a search over a corpus of data. While many data structures might be used with a data classification system, a typical example is a corpus containing many, many data items organized as units such as records or documents. While a document is used as an example of a data item, it should be understood that statements might be equally applicable to data items that are not normally referred to as documents.

A data classification system might be used to a filter documents from a large corpus to flag or otherwise identify relevant documents distinctly from less relevant documents. As an example, a company or an analyst might want to review news items from a large corpus of news items, but only those news items that relate to a particular company or set of companies. They could use a data classification system to flag news items that relate to the companies of interest and provide those relevant documents for further processing, such as manual review.

In the general case, a data classification system classifies documents as being "in" or "not in" a particular class, or classifies documents as being in one or more of two or more classes. In an extremely simple data classification system, a class might be "all documents containing phrase P" and the simple data classification system classifies each document as either being in the class or not being in the class (binary decision). In other simple, but slightly more involved data classification systems, the class might be "all documents mentioning phrase P or its synonyms" or the class might be "all documents apparently relating to topic T".

A conventional data classification system might first convert documents into enumerated features though a process of feature generation. One way that this can be done is to tokenize text into a distinct dictionary of features with associated enumerated values. Advanced techniques may pre-process text with grammatical knowledge to enrich tokens in a way to aid in a classification task (e.g., part-of-speech POS tagging, negation prefixing, etc.). "Stop" words ("a", "the", "but", "and", etc.) are often removed to improve efficiency. With each document distilled to a set of enumerated features, the data classification system can then perform feature selection, selecting a subset of features that either enhance, or at least minimize loss of, the information content of the document. Arguably, feature selection is primarily performed for efficiency reasons, as many machine learning algorithms display non-linear efficiency with respect to the number of distinct features.

The selected features can be weighted (which can also be thought of as a "soft" feature selection, where some features are selected strongly and other features are selected weakly), to enhance a machine learning algorithm. An example of feature weighting is the use of Inverse Document Frequency (IDF), wherein terms get more weight if they occur more frequently than their general average in a wider corpus and less weight if they appear less frequently than their general average.

The above processes can be done on documents in a training corpus as well as documents in the corpus that are to be classified. Training might involve providing the data classification system with a corpus and classifications for each document in the training corpus. Thus, for a simple binary classification process, some of the documents in the training corpus are tagged as being examples of members of the class while the others are tagged as being counterexamples.

The data classification system then operates a training process wherein discriminating patterns are preferably discovered in the training corpus between the examples and the counterexamples. Techniques for pattern discrimination have been studied in considerable detail. Examples of machine learning classification techniques include, but are not limited to, Naïve Bayes, Support Vector Machines, Maximum Entropy, and k-nearest neighbor. Others might be found in use or in literature on the topic.

More complex data classification systems have been developed. For example, instead of simply classifying an input document as being an example of a member of the class or a counterexample (a binary classification), the input document might be classified into one of more than just two possibilities (M-ary classification into M classes). For example, when evaluating news stories, a simple data classification system might just make a binary decision as to whether a particular news story refers to topic T or not, while a more complex data classification system might define each class as relating to a particular topic and would classify the input document into one or more of two or more classes.

Data classification systems might make hard decisions as to how to classify a given input document. Some data classification systems might make soft decisions, wherein an input document is not necessarily classified into a class with absolute certainty, but it is tagged with one or more value(s) indicating the degree(s) to which the document would be associated with each of one or more classes.

One problem with existing data classification systems is that real world examples might be more involved and items would be classified differently depending on other considerations. Hence, there is a considerable need in the art for a more sophisticated classification system capable of classifying items based on multiple inputs into multidimensional categories.

BRIEF SUMMARY OF THE INVENTION

One aspect of the present invention provides a method of data classification, wherein an input item is classified by associating the input item with one or more classes from a set of one or more classes in a data classification system, including identifying relevant features in an input item to form a feature vector for the input item, receiving at the data classification system an indication of a point-of-view, adjusting the feature vector according to the point-of-view indication or modifying a pattern discriminator (e.g., trainer and classifier) to inline-process feature vectors depending on the provided point-of-view (e.g., SVM custom kernels), and classifying the input item into the set of classes according to the pointof-view. The point-of-view data can be introduced either as a pre-process step prior to passing it off to the pattern discriminator, or can be incorporated directly into the pattern discriminator if it is applicable (e.g., custom kernels in a support vector machine could be enhanced with point-of-view data). The pattern discriminator can detect arbitrary patterns given a similarly prepared dataset during both training and subsequent classification of unclassified documents.

Some advantages of such a system include improved accuracy within a given classification problem, as it focuses the pattern discrimination engine on the correct context given a point-of-view to operate from. Another advantage is improvements over applications of a given trained model to new points-of-view not incorporated in the original training. This can be the result of methodologies focusing on the features related to the point-of-view while having the effect of abstracting the point-of-view itself.

Another aspect of the present invention provides a data classification system, wherein the system includes at least one input item, at least one feature vector, and at least one data classifier defined by point-of-view dependency, wherein the system uses feature weighting in order to rate and classify input items. The data classifier classifies one or more data sets based upon patterns observed during a training process with one or more training data sets. In addition, the data classification system may rely on a mathematical engine, such as a support vector machine, to engage in feature weighting.

As used herein, each item to be classified is described as a document, but it should be understood that items that are classified are not limited to items that are considered documents in all contexts. For example, an input item may include, but is not limited to, a word processing document, a file of a particular format (e.g., ASCII file, XML file, UTF-8 file, etc.), a collection of documents with some structural organization, an image, text, a combination of images and text, media, spreadsheet data, a collection of bytes, or other organizations of data or data streams. A data classification system is provided with access to one or more of the items of the corpus and based upon the analysis of the one or more items, the data classification system arrives at a determination about each of the one or more items, where an example determination is whether or not a given item belongs into a particular class. In some cases, the data classification system is "trained" using examples, wherein the data classification system is provided with several example items and an indication, for each of the example items, of the classification for those example items.

The invention further encompasses data classifiers that classify received data sets based upon specific patterns. These patterns are observed during a training process with training data sets.

A further understanding of the nature and advantages of the inventions herein may be realized by reference to the remaining portions of the specification and the attached drawings.

BRIEF DESCRIPTION OF THE DRAWINGS

The present invention is best understood when read in conjunction with the accompanying figures which serve to illustrate the preferred embodiments. It is understood, however, that the invention is not limited to the specific embodiments disclosed in the figures.

DETAILED DESCRIPTION OF THE INVENTION (a) Definitions and General Parameters

The following definitions are set forth to illustrate and define the meaning and scope of the various terms used herein.

The terms "input item" and "document" are interchangeably used herein and refer to any item that can be used in conjunction with the present classification method. For example, an input item may include, but is not limited to, a word processing document, a file of a particular format (e.g., ASCII file, XML file, UTF-8 file, etc.), a collection of documents with some structural organization, an image, text, a combination of images and text, media, spreadsheet data, a collection of bytes, or other organizations of data or data streams.

The term "relevant feature" refers to a uniquely identifiable attribute that could affect the detection of patterns within a corpus. Relevant features might be domain specific, for example, in the case of English text classification, a relevant feature might be the presence of a unique word within a document, regardless of position.

A "feature vector", as used herein, refers to a list of features describing an instance, wherein a feature is the specification of an attribute and its value. For example, in the case of English text classification, the attribute of a feature might be a unique word within a document and the value of the feature might be the number of occurrences of the unique word within the document.

The term "classifier" refers to a system, apparatus or code for mapping from unlabeled instances to discrete classes. Classifiers may use a mapping form (e.g., decision tree) and an interpretation procedure; including rules for how to handle unknowns. Some classifiers might also provide probability estimates or scores. These scores can be evaluated to yield a discrete decision.

The term "trainer" refers to a system, apparatus or code for examining a set of known labeled instances to detect implicit patterns and create models. Classifiers can then apply these models to future unlabelled instances to generate discrete classes (see "classifier").

The terms "point-of-view" and "POV" are interchangeably used herein and refer to a variable frame of reference when examining or processing a current document. The same instance may be placed in different classes given different "point-of-views".

(b) Data Classifiers with Point-of-View Dependencies

Figure 1:
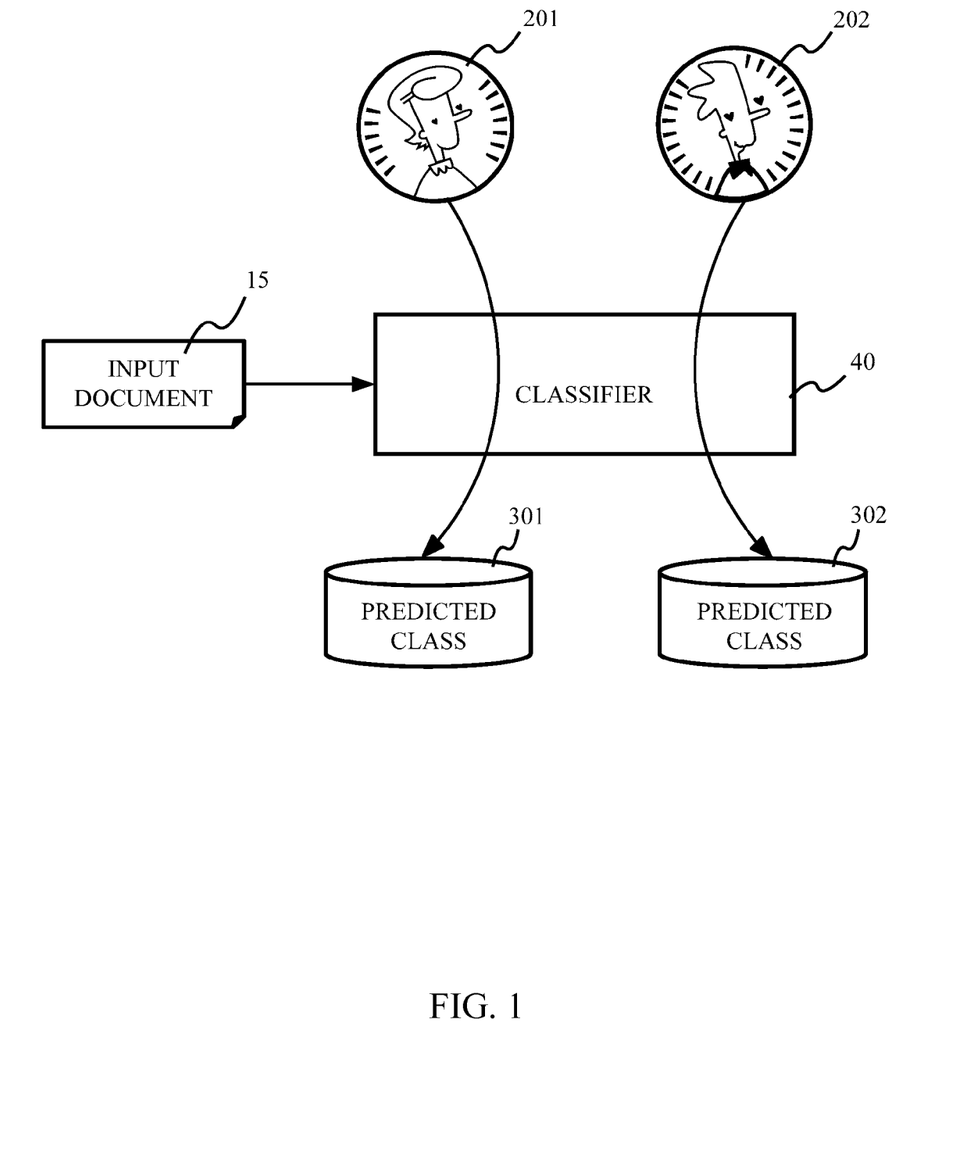
FIG. 1 illustrates a classifier with point-of-view dependencies according to aspects of the present invention.

FIG. 1 is a block diagram of a classifier with point-of-view dependencies according to embodiments of the present invention. Using the novel data classification systems and methods described herein, input documents can be classified into classes for a given point of view (point-of-view dependency). In many cases, a corpus might be divided into classes one way for one point-of-view and would be divided into those classes differently for a different point-of-view. As shown in FIG. 1, classifier 40 might classify an input document 15 into class 301 or 302 depending on a given point of view 201 or 202. This allows for improved data assessment over a conventional data classification system that might always classify a document into an example or a counterexample (or one or more of a plurality of classes in M-ary classification).

An example illustrating the instant system might be the collection of documents regarding a lawsuit. The documents will likely contain references to a defendant (e.g., company A) and several side references to other companies (e.g., companies B-D). From the point-of-view of company A, the documents should be classified as belonging to a lawsuit class that company A may track and analyze daily. From the point of view of companies B-D, the very same documents would not be considered lawsuit documents (i.e., classified under a lawsuit class) because, from their perspective, the documents are not about a lawsuit concerning companies B-D.

In another example, an analyst might be searching a news report corpus for articles about layoffs and the data classification system might classify incoming articles as being about layoffs, or not about layoffs. Given a document with two threads of discussion, one regarding layoffs at Company A and one regarding a merger at Company B, a traditional data classification system would only recognize that the article is about layoffs regardless of whether it concerns Company A or Company B. However, in embodiments of a novel data classification system as described herein, this distinction is easily made. As such, the system is trained against the difference and would be able to, when given the Company A point-of-view, correctly classify as Layoffs and when given the Company B point-of-view, correctly classify as NOT-Layoffs within the same document. Hence, the classification of "sentiment" or "favorability" applies perfectly herein, i.e., given a certain document, it may easily be defined as "favorable" for one company and defined as "unfavorable" for another company.

Figure 2:
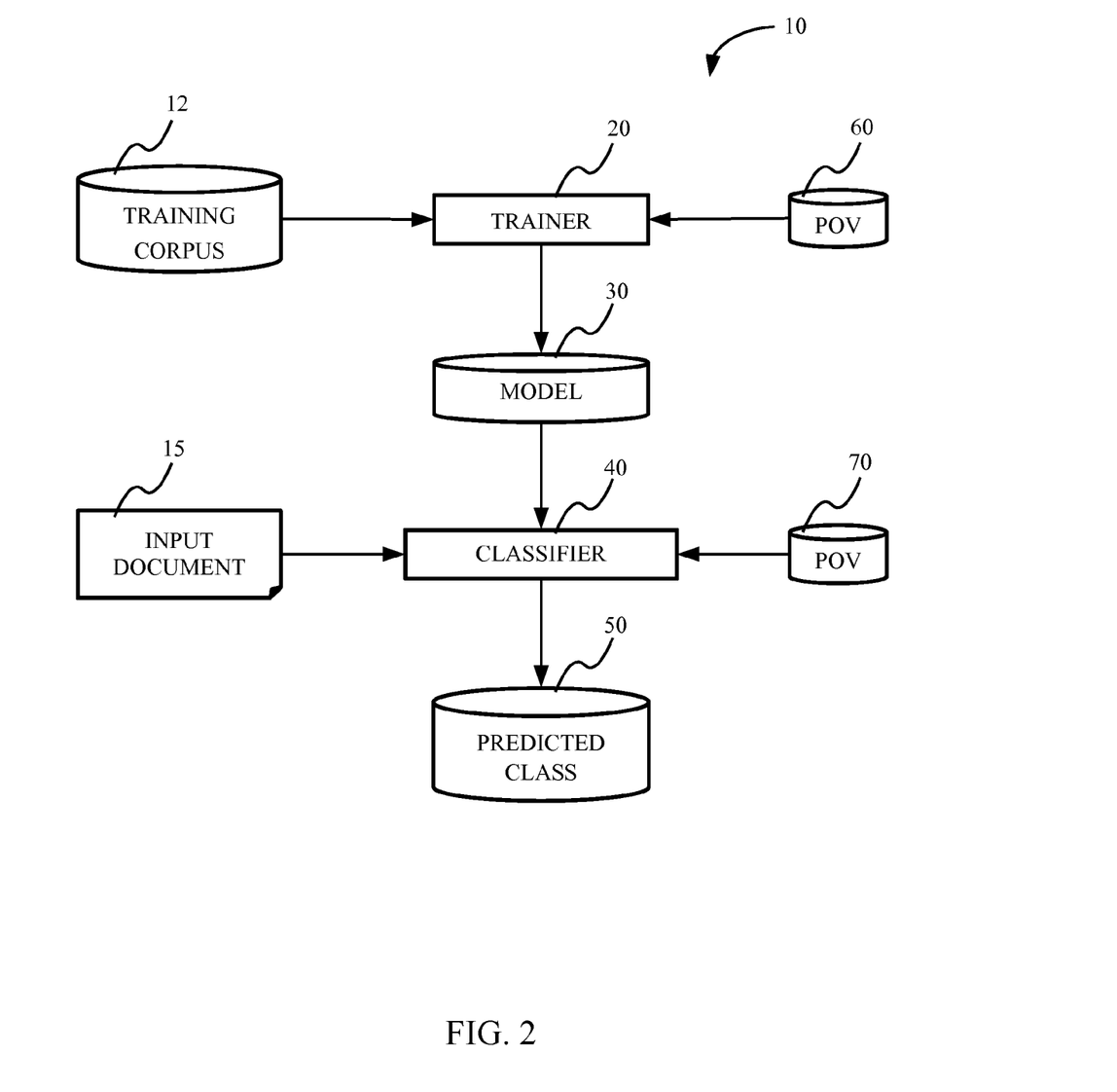
FIG. 2 illustrates a data classification system according to aspects of the present invention.

FIG. 2 is a high-level block diagram illustrating a data classification system 10 according to the present invention. System 10 accepts a training corpus, such as training corpus 12, for training the data classification system. In one embodiment, the training corpus 12 contains labeled documents. For a simple binary data classification system in this embodiment, some of the documents in the training corpus are tagged as being examples of members of the class while the others are tagged as being counterexamples. The data classification system 10 then operates a trainer 20 wherein discriminating patterns are discovered in the training corpus 12 between the examples and counterexamples to generate a model 30. Examples of pattern discrimination techniques include, but are not limited to, Naïve Bayes, Support Vector Machines, Maximum Entropy, and k-nearest neighbor.

When a new input document 15 is presented, system 10 operates a classifier 40, which classifies document 15 using model 30 and generates a predicted class 50. For example, in a simple binary classification system, document 15 is classified as either being in the class or not being in the class.

Point of view (POV) 60 includes context sensitive information to enable trainer 20 to discriminate a single classification between multiple points-of-view. Similarly, POV 70 is an input to classifier 40 to enable it to generate a single classification between multiple points-of-view.

Figure 3:
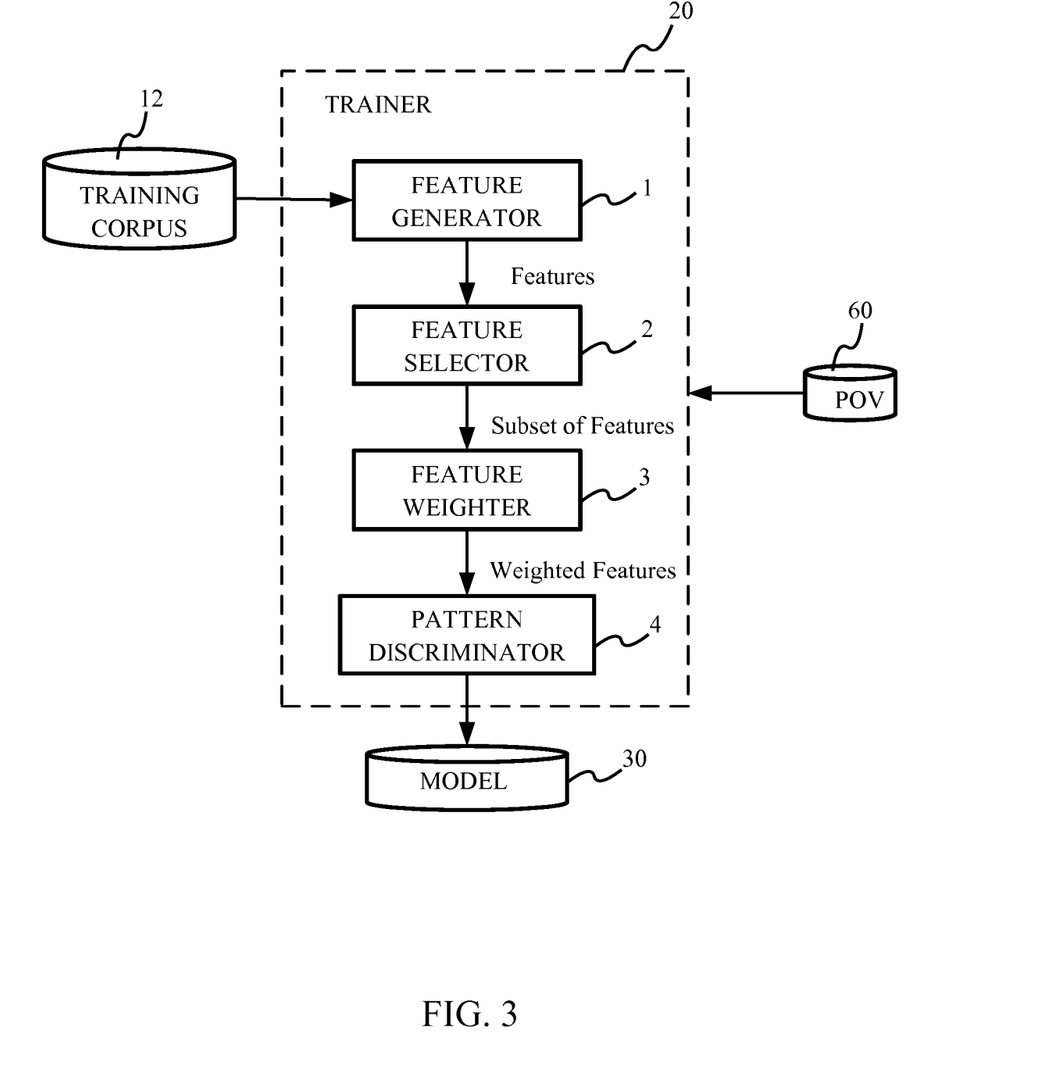
FIG. 3 illustrates a trainer in a data classification system according to aspects of the present invention.

FIG. 3 shows trainer 20 in greater detail. Trainer 20 accepts a training corpus 12 as its input and outputs a model 30 with discerned patterns in training corpus 12. In the figure, trainer 20 is shown with a feature generator 1, feature selector 2, feature weighter 3, and a pattern discriminator 4. Feature generator 1 generates, from input corpus 12, features to be considered for discrimination. With each document in training corpus 12 distilled to a set of enumerated features, trainer 20 can then operate feature selector 2 to select a subset of features that either enhance, or at least minimize loss of, the information content of the document. Feature selection is primarily performed for efficiency reasons, as many pattern discrimination techniques display non-linear efficiency with respect to the number of distinct features. Feature weighter 3 then weights the selected features to enhance a pattern discrimination algorithm. Finally, a pattern discriminator 4 is run to discriminate patterns within the training corpus, where the pattern discriminator is optionally provided with a custom kernel when the pattern discriminator supports it. Point-of-view information 60 can be introduced in various components of trainer 20 to discriminate a single classification between multiple points-of-view.

Figure 4:
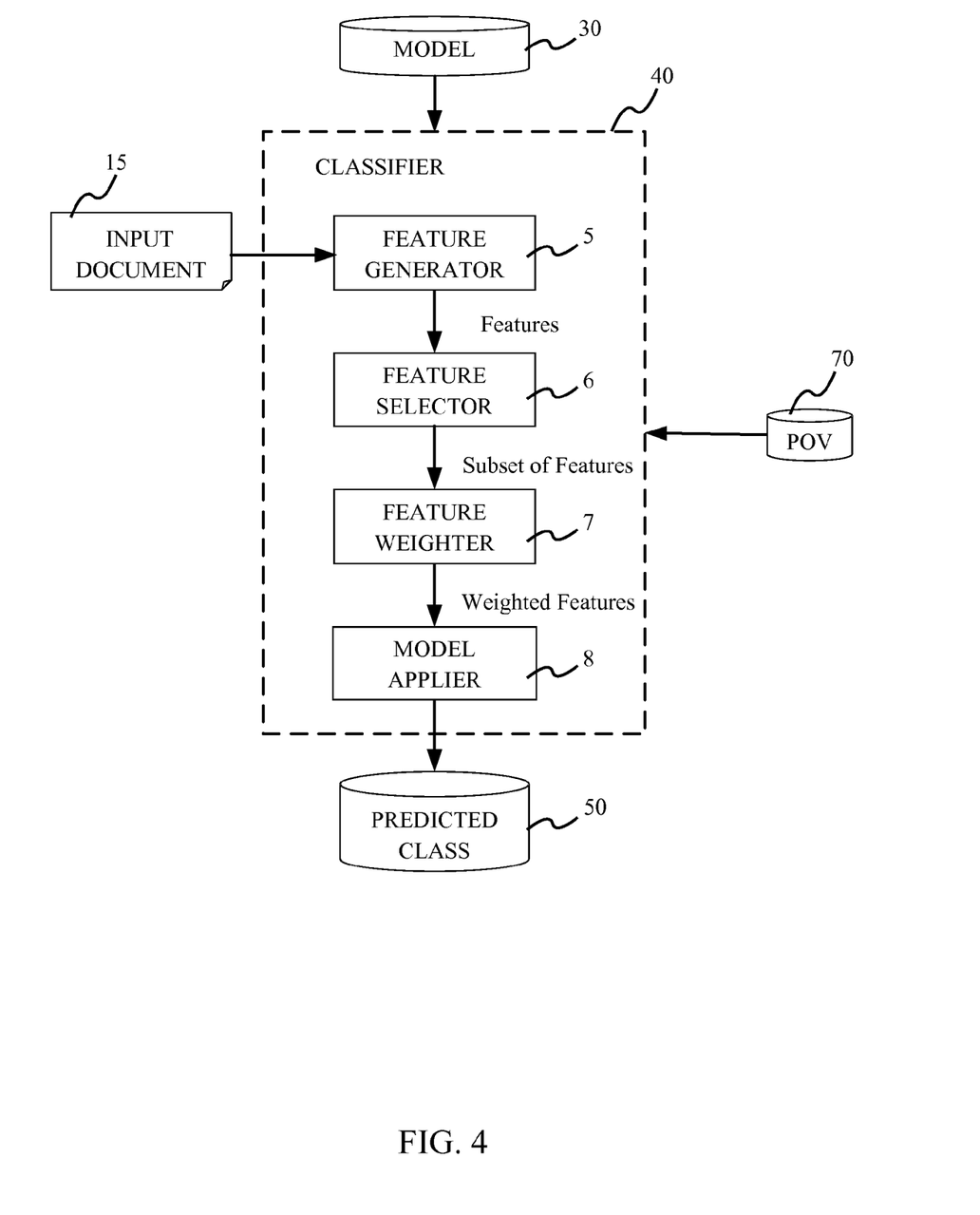
FIG. 4 illustrates a classifier in a data classification system according to aspects of the present invention.

FIG. 4 shows classifier 40 in greater detail. Classifier 40 accepts an input document 15 as its input and outputs a predicted class 50 for input document 15. In the figure, classifier 40 is shown with a feature generator 5, a feature selector 6, a feature weighter 7, and a model applier 8. Feature generator 5 generates features from input document 15 to be considered for discrimination. After input document 15 is distilled into a set of enumerated features, classifier 40 can then operate a feature selector 6 to select a subset of features that either enhance, or at least minimize loss of, the information content of the document. Feature weighter 7 then weights the selected features. Finally, a model applier 8 applies model 30 to input document 15 to predict the class of input document 15, where a custom kernel is optionally provided to model 30. Predicted class 50 is produced optionally with confidence values for input document 15. Point-of-view information 70 can be introduced in various components of classifier 40 to enable it to generate a single classification between multiple points-of-view.

POV information uses include, but are not limited to, custom feature generation, feature selection, feature weighting and custom kernel generation. Custom feature generation based on POV could generate additional features not normally generated in traditional classification systems where the additional features may be indicative of a relationship between a given POV and a conventional feature. Feature selection might be based on POV, wherein features that appear unrelated are stripped out from the vector. Feature weighting might also be based on POV, wherein features are weighted based on relationship (i.e., the value associated with the attribute is modified in cases where the pattern discrimination engine supports it). Similarly, a custom kernel might be created when a pattern discriminator supports it (e.g., Support Vector Machine (SVM)). The custom kernel can apply POV weighting of features dynamically during training and classification.

(c) Examples

The following specific examples are intended to illustrate embodiments of data classification systems according to aspects of the invention and should not be construed as limiting the scope of the claims.

(i) Point-of-View (POV) Sentiment Ratings

A novel data classification system might employ POV sentiment ratings. These ratings capture a person's or organization's point-of-view on any sentiment (e.g., article sentiment) using a positive, neutral, and negative (3-point) scale. In this system, documents can be classified as positive, neutral or negative documents, with respect to a particular POV. This can be used to provide an automated point-of-view sentiment classification service. Where a document must be classified as positive, neutral or negative, the data classification system performs ternary classification. In other variations, gradations of positive and negative are possible, yielding the more than three classes to choose from, e.g., "strongly positive", "positive", "slightly positive", neutral, etc. In order to achieve the ternary classification, the data classification system is trained with a training corpus wherein each document in the corpus is labeled with its class. The data classification system can then create three models: a positive model, a neutral model, and a negative model. This process can be expanded to classification into more than three classes.

The ratings extend a particular point-of-view to all articles for a specific subject such as a company, competitor, or the like. The user can gain business insights from enhanced sentiment reports as well as sentiment report filters in all other reports. There are many examples of how the user may gain important business insights by using the systems described herein. For example, a user employed by company X may need to know who the top authors are that are currently writing negative articles (i.e., negative from company X's perspective) about a competitive lawsuit, wherein the user is particularly interested in all articles written during the last week (i.e., top authors/negative articles/lawsuit company topic/seven days rating). Alternatively, the user may need to find out how editorial coverage opinion is changing with respect to company X's handling of a specific crisis (i.e., sentiment over time/crisis company topic rating). Yet in another scenario, the user may need to investigate what types of publications contain positive articles about company X's recent product launch (top publications/positive articles/product launch company topic rating).

Figure 5:
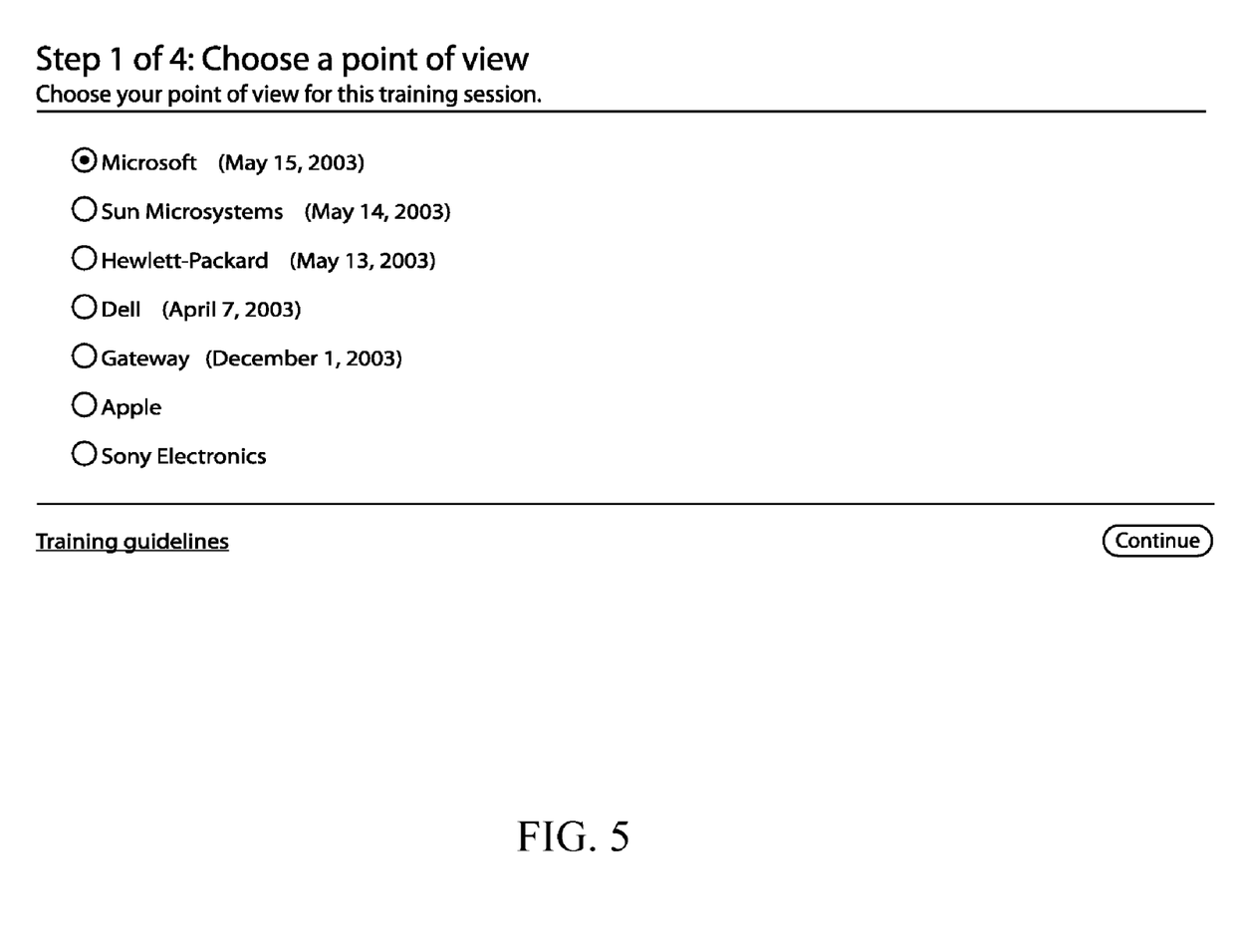
FIG. 5 illustrates a system wizard usable for accepting user input of a point of view for a training session.
Figure 6:
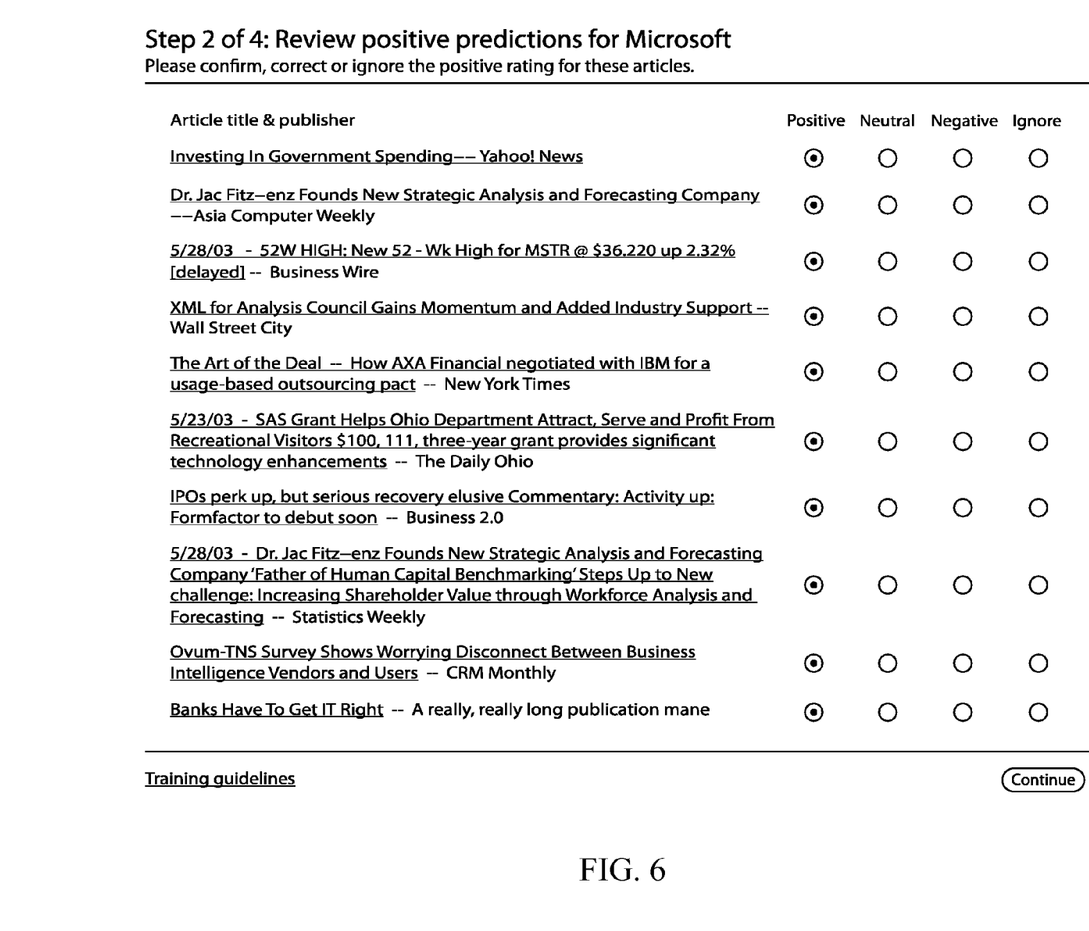
FIG. 6 illustrates a system wizard usable for accepting user input on variances of the predicted sentiment for an automatically selected set of articles.

Sentiment ratings can be automatically applied as articles enter the system, i.e., without human intervention. More specifically, the sentiment ratings might work through a system wizard that captures the point-of-view for a subject while a person reviews and validates ratings such as ratings on articles. FIG. 5 illustrates a step of a system wizard, which asks an user to choose a point of view for a training session. For example, the user is asked to choose among Microsoft, Sun Microsystems, Hewlett-Packard, Dell, Gateway, Apple, and Sony Electronics as the point of view for the training session. FIG. 6 shows another step of the system wizard, which asks an user to confirm, correct or ignore the predicted sentiment for an automatically selected set of articles. For example, the user is asked to review positive predictions for a set of articles for Microsoft. In a practical setting, new or revised ratings can be applied overnight to all articles for a subject within the system. New articles receive ratings as they enter the system.

In one embodiment, the data classification systems and methods of the instant invention employ event-based machine learning, including an advanced patterns recognition engine, point-of-view capture algorithms, pre-population with a large corpus of rated events, and closed-loop learning for continued point-of-view learning. Generally, the more the system is taught the more the system knows. Hence, the wizard can be run multiple times (i.e., trained) which improves rating consistency.

The wizard can be trained any time the user desires to tune sentiment ratings and a new point-of-view may be applied to an entire user account history in batch mode. Moreover, manual ratings and individual article manual overrides can be incorporated into new ratings going forward. Under specific circumstances, it may be necessary to rerun the wizard, particularly when there is a dramatic change in the article profiles. For example, if company X is confronted with a new crisis or company X changes from being a private company to being a public company, the wizard may have to be rerun and thus retrained.

After training, the data classification system can be used to predict classification of an unlabeled instance. For example, in a ternary classification system, each of the three models is applied in order to predict classification, and a confidence number is returned from each model's classification. Since the three models may disagree (two or more models could claim that the instance is in that model's class), a weighting scheme is applied amongst the three models to break disagreement and produce the single predicted class.

In tests, one implementation was 77%-97% accurate depending on the scenario. This was generated by training on ⅔ of a labeled corpus and testing classification against the remaining ⅓ of a labeled corpus. When a conventional process stack was applied against the same problem, in-corpus accuracy dropped significantly (10-30%), and cross-corpus accuracy (application of trained model to a new corpus in different domain) fell to statistically insignificant levels (i.e., the results were no more accurate than random guesses).

(ii) SVM Pattern Discrimination

In one example, a Support Vector Machine (SVM) pattern discrimination algorithm was chosen for classification. SVMs are capable of operating efficiently on large feature spaces, which reduces the need to modify feature vectors for efficiency reasons. In addition, SVMs support the concept of "weighting" feature vectors which was initially used.

In the feature weighting scheme that was examined, one can apply a relatively unsophisticated algorithm of weighting. Given a bag of aliases representing a simplistic Point-of-View (e.g., "IBM®", "International Business Machines", "Big-Blue"), one can weight all features against sentence-level proximity to an alias within the bag. In the test-case, a feature was weighted according to the number of sentences away from the nearest alias, using the formula shown in Equation 1, where FSP is feature-to-sentence proximity going forward from the alias and BSP is feature-to-sentence proximity going backward from the alias.

$$\text{FeatureWeight} = \text{Max}(0.95^{FSP}, 0.80^{BSP}) \tag{Equ. 1}$$

Using the formula of Equation 1 had the effect of giving more weight to features closer to the point-of-view, with more weight given for a proximity forward of the POV and less weight given for a proximity prior to the POV. Using that equation, documents were distinguishable on the basis of POV.

Thus, adding context sensitive information to the feature vector enables the mathematical engine to discriminate a single classification between different POVs. This information can be added in any of the components in FIG. 3 and FIG. 4. In this example, it is done within "feature weighter" however it is equally applicable to all components.

Various modifications and variations of the present invention will be apparent to those skilled in the art without departing from the scope and spirit of the invention. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the claims.

What is claimed is:

1. A method of classification using a classifier that reads in input items and outputs indications of one or more classification for the input items, wherein an input item is classified by associating the input item with one or more classes from a set of classes in a data classification system, said method comprising the steps of:
receiving, by the classifier, the input item to be classified;
identifying, by the classifier, relevant features in the input item to form a feature vector for the input item;
receiving an indication from a user of a first entity's point-of-view at the classifier, wherein the first point-of-view is selected from a plurality of points-of-view, each of the plurality of points-of-view defining a frame of reference for automated use by the classifier in outputting the indications of the one or more classification for the input items, wherein the user and the first entity are different;
adjusting, by the classifier, the feature vector or modifying a pattern discriminator according to the first point-of-view indication;
classifying, by the classifier, the input item into a first class according to the first point-of-view;
receiving an indication from the user of a second entity's point-of-view at the classifier, wherein the second point-of-view is selected from the plurality of points-of-view and defines a different frame of reference from that of the first point-of-view, wherein the user and the second entity are different;
adjusting, by the classifier, the feature vector or modifying a pattern discriminator according to the second point-of-view indication; and
classifying, by the classifier, the input item into a second class according to the second point-of-view.

2. The method of claim 1, wherein in the step of adjusting, by the classifier, the feature vector comprises generating custom features.

3. The method of claim 1, wherein in the step of adjusting, by the classifier, the feature vector comprises selecting a subset of features.

4. The method of claim 1, wherein the step of modifying a pattern discrimination algorithm comprises generating a custom kernel.

5. The method of claim 1, wherein in the step of adjusting, by the classifier, the feature vector comprises weighting features.

6. The method of claim 5, wherein weighting features use proximity weighting.

7. The method of claim 6, wherein proximity weighting calculates weight of a feature as the maximum of 0.95 raised to the power of the number of sentences going forward from a nearest alias to the feature ("FSP") and 0.80 raised to the power of the number of sentences going backward from a nearest alias to the feature ("BSP"), wherein an alias is a representation of a point-of-view.

8. The method of claim 1, wherein the input item is selected from the group consisting of a word processing document, an ASCII file, an XML file, a UTF-8 file, a collection of documents with some structural organization, an image, a text, a combination of images and text, media, spreadsheet data, a collection of bytes, an organization of data and a data stream.

9. The classification method of claim 1, further comprising:
associating the input item with a first sentiment rating as a function of the first point-of-view and associating the input item with a second sentiment rating as a function of the second point-of-view,
wherein each of the first sentiment rating and the second sentiment rating indicates one of at least three sentiment rating levels relating to a favorability classification predetermined according to the respective point-of-view.

10. The classification method of claim 9, wherein a first of the at least three sentiment rating levels indicates a positive favorability, a second of the at least three sentiment rating levels indicates a neutral favorability, and a third of the at least three sentiment rating levels indicates a negative favorability.

11. A classification method comprising:
receiving, at a classifier system, an input item for classification;
identifying, at the classifier system, relevant features of the input item;
forming, at the classifier system, a feature vector for the input item based on the identified features;
adjusting, at the classifier system, the feature vector according to a first point-of-view;
classifying, at the classifier system, the input item into a classification based on the first point-of-view, wherein
the first point-of-view defines a frame of reference for automated use by the classifier system in classifying the input item,
the input item is classified into a first class based on the first point-of-view, and
the first point-of-view is a point-of-view of a person or an organization;
adjusting, at the classifier system, the feature vector according to a second point-of-view;
classifying, at the classifier system, the input item into a classification based on the second point-of-view, wherein
the second point-of-view defines a frame of reference for automated use by the classifier system in classifying the input item,
the input item is classified into a second class based on the second point-of-view, and
the second point-of-view is of a different person or a different organization than the first point-of-view.

12. The data classification method of claim 11, wherein the input item is selected from the group consisting of a word processing document, an ASCII file, an XML file, a UTF-8 file, a collection of documents with some structural organization, an image, a text, a combination of images and text, media, spreadsheet data, a collection of bytes, an organization of data and a data stream.

13. The data classification method of claim 11, wherein the input item is classified based upon patterns observed during a training process with one or more training data sets.

* * * * *